United States Patent
Arik et al.

(10) Patent No.: US 12,039,443 B2
(45) Date of Patent: *Jul. 16, 2024

(54) DISTANCE-BASED LEARNING CONFIDENCE MODEL

(71) Applicant: Google LLC, Mountain View, CA (US)

(72) Inventors: Sercan Omer Arik, San Francisco, CA (US); Chen Xing, Sunnyvale, CA (US); Zizhao Zhang, San Jose, CA (US); Tomas Jon Pfister, Foster City, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,722

(22) Filed: Oct. 11, 2022

(65) Prior Publication Data

US 2023/0120894 A1    Apr. 20, 2023

Related U.S. Application Data

(63) Continuation of application No. 17/031,144, filed on Sep. 24, 2020, now Pat. No. 11,487,970.

(Continued)

(51) Int. Cl.
*G06N 3/08* (2023.01)
*G06F 18/214* (2023.01)
(Continued)

(52) U.S. Cl.
CPC ............ *G06N 3/08* (2013.01); *G06F 18/2148* (2023.01); *G06F 18/2413* (2023.01); *G06F 18/2431* (2023.01); *G06N 3/04* (2013.01)

(58) Field of Classification Search
CPC ............ G06F 18/2148; G06F 18/2413; G06F 18/2431; G06N 3/04; G06N 3/045; G06N 3/08

See application file for complete search history.

(56) References Cited

U.S. PATENT DOCUMENTS

2008/0211812 A1*  9/2008  Barbu .................... G06F 18/214
                                                          382/131
2012/0141018 A1*  6/2012  Shiell ................. G06V 10/7557
                                                          382/159

(Continued)

OTHER PUBLICATIONS

Anh Nguyen,"Deep Neural Networks Are Easily Fooled: High Confidence Predictions for Unrecognizable Images,"Jun. 2015, Proceedings of the IEEE Conference on Computer Vision and Pattern Recognition (CVPR), 2015,pp. 427-433.*

Mikhail Bilenko,"Learning to Combine Trained Distance Metrics for Duplicate Detection in Databases,"Feb. 22, 2002, Technical Report AI-02-296, Artificial Intelligence Lab,University of Texas at Austin, Feb. 2002,pp. 2-16.*

(Continued)

*Primary Examiner* — Omar S Ismail
(74) *Attorney, Agent, or Firm* — DORITY & MANNING P.A.

(57) ABSTRACT

A method includes receiving a training data set including a plurality of training data subsets. From two or more training data subsets in the training data set, the method includes selecting a support set of training examples and a query set of training examples. The method includes determining, using the classification model, a centroid value for each respective class. For each training example in the query set of training examples, the method includes generating, using the classification model, a query encoding, determining a class distance measure, determining a ground-truth distance, and updating parameters of the classification model. For each training example in the query set of training examples identified as being misclassified, the method further includes generating a standard deviation value, sampling a new query, and updating parameters of the confidence model based on the new query encoding.

18 Claims, 6 Drawing Sheets

Related U.S. Application Data

(60) Provisional application No. 62/904,978, filed on Sep. 24, 2019.

(51) Int. Cl.
 *G06F 18/2413* (2023.01)
 *G06F 18/2431* (2023.01)
 *G06N 3/04* (2023.01)

(56) References Cited

U.S. PATENT DOCUMENTS

| | | | | |
|---|---|---|---|---|
| 2012/0195495 | A1* | 8/2012 | Shiell | G06F 18/231 |
| | | | | 382/159 |
| 2013/0343642 | A1* | 12/2013 | Kuo | G06V 10/56 |
| | | | | 382/159 |
| 2015/0302317 | A1* | 10/2015 | Norouzi | G06N 20/00 |
| | | | | 706/12 |
| 2017/0068904 | A1* | 3/2017 | Korycki | G06N 20/00 |
| 2017/0068906 | A1* | 3/2017 | Korycki | G06N 20/00 |
| 2017/0098153 | A1* | 4/2017 | Mao | G06N 3/045 |
| 2018/0150764 | A1* | 5/2018 | Stenneth | G01C 21/3815 |
| 2019/0073520 | A1* | 3/2019 | Ayyar | G06V 40/173 |
| 2019/0130217 | A1* | 5/2019 | Wu | G06T 5/20 |
| 2019/0213426 | A1* | 7/2019 | Chen | G06T 7/20 |
| 2019/0303703 | A1* | 10/2019 | Kumar | G06V 10/82 |
| 2019/0304157 | A1* | 10/2019 | Amer | G06V 40/23 |
| 2019/0325259 | A1* | 10/2019 | Murphy | G06F 18/2148 |
| 2019/0385738 | A1* | 12/2019 | Hoelzer | G06V 10/772 |
| 2020/0065384 | A1* | 2/2020 | Costello | G06N 3/04 |
| 2020/0074247 | A1* | 3/2020 | Dubovsky | G06F 18/2431 |
| 2020/0104643 | A1* | 4/2020 | Hu | G06N 3/045 |
| 2020/0193552 | A1* | 6/2020 | Turkelson | G06N 20/20 |
| 2020/0272938 | A1* | 8/2020 | Desmond | G06N 20/00 |
| 2020/0320769 | A1* | 10/2020 | Chen | G06F 18/214 |
| 2020/0410012 | A1* | 12/2020 | Moon | G06Q 10/04 |
| 2021/0004589 | A1* | 1/2021 | Turkelson | G06V 30/19173 |
| 2021/0073671 | A1* | 3/2021 | Puri | G06N 5/04 |

OTHER PUBLICATIONS

Rita Chattopadhyay,"Joint Transfer and Batch-mode Active Learning,"Jun. 16, 2013,Proceedings of the 30 th International Conference on Machine Learning, Atlanta, Georgia, USA, 2013. JMLR:W&CP vol. 28,pp. 1-8.*

Yunhui Long,"Understanding Membership Inferences on Well-Generalized Learning Models," Feb. 13, 2018,arXiv:1802.04889, https://arxiv.org/abs/1802.04889,pp. 1-13.*

Chen Xing,"Distance-Based Learning From Errors for Confidence Calibration," Feb. 18, 2020, Published as a conference paper at ICLR 2020, pp. 1-7.*

Noureddine Ghoggali, "Automatic Ground-Truth Validation With Genetic Algorithms for Multispectral Image Classification," Jun. 19, 2009, IEEE Transactions on Geoscience and Remote Sensing, vol. 47, No. 7, Jul. 2009,pp. 2172-2175.*

Nicolas Papernot,"Deep k-Nearest Neighbors: Towards Confident, Interpretable and Robust Deep Learning,"Mar. 13, 2018,arXiv:1803.04765,pp. 1-12.*

Yushi Chen,"Deep Feature Extraction and Classification of Hyperspectral Images Based on Convolutional Neural Networks,"Aug. 11, 2016.IEEE Transactions on Geoscience and Remote Sensing, vol. 54, No. 10, Oct. 2016,pp. 6232-6249.*

Thomas A. Lampert,An Empirical Study Into Annotator Agreement, Ground Truth Estimation, and Algorithm Evaluation,Apr. 19, 2016,IEEE Transactions on Image Processing, vol. 25, No. 6, Jun. 2016,pp. 2557-2569.*

Guiguang Ding,"DECODE: Deep Confidence Network for Robust Image Classification,"Jun. 13, 2019,IEEE Transactions on Image Processing, vol. 28, No. 8, Aug. 2019,pp. 3752-3760.*

Anh Nguyen,"Deep Neural Networks Are Easily Fooled: High Confidence Predictions for Unrecognizable Innages,"Jun. 2015, Proceedings of the IEEE Conference on Computer Vision and Pattern Recognition (CVPR), 2015,pp. 427-433.

Yunhui Long,"Understanding Membership Inferences on Well-Generalized Learning Models," Feb. 13, 2018, arXiv:1802.04889, <https://arxiv.org/abs/1802.04889,Pages> 1-13.

* cited by examiner

Algorithm 1: One update of the proposed algorithm. $M$ is the total number of classes in the training set. $N$ is the number of classes in every episode, $K$ is the number of supports for each class, $K_Q$ is the number of queries for each class.

```
Input: Training set D_train = {(x_i, y_i)}_i, y_i ∈ {1, ..., M}, D_train^c = {(x_i, y_i) ∈ D_train | y_i = c}.
# Build training episode e
Select N classes for episode e
C ← RandomSample({1, ..., M}, N)
Sample supports and queries for every class in e
for c in C do
    S_e^c ← RandomSample(D_train^c, K)
    Q_e^c ← RandomSample(D_train^c \ S_e^c, K_Q)
end for
# Compute Loss
Compute prototype representation for every class c in e
for c in C do
    p_c ← (1/|S_e^c|) Σ_{(s_i,y_i)∈S_e^c} f_θ(s_i)
end for
Compute prototypical loss for classification
L(θ) ← 0
for c in C do
    for (q_i, y_i) in Q_e^c do
        μ_i = f_θ(q_i)
        L(θ) ← L(θ) + (1/(N·K))[d(μ_i, p_{y_i}) + log Σ_k exp(−d(μ_i, p_k))]
    end for
end for
Compute confidence loss
L(φ) ← 0
Make predictions and track misclassified training samples
M_e = {}
for c in C do
    for (q_i, y_i) in Q_e^c do
        y'_i = argmax_c  exp(−d(μ_i, p_c)) / Σ_k exp(−d(μ_i, p_k))    #μ_i = f_θ(q_i)
        if y'_i ≠ y_i then
            M_e ← AddTo(q_i, y_i)
        end if
    end for
end for
Compute confidence loss with misclassified training samples
for (q_i, y_i) in M_e do
    σ_i = f_φ(μ_i)   #μ_i = f_θ(q_i)
    ε ~ N(0, 1)
    z_i = μ_i + ε · σ_i
    L(φ) ← L(φ) + (1/(N·K))[d(z_i, p_{y_i}) + log Σ_k exp(−d(z_i, p_k))]
end for
# Update θ with prototypical loss for classification
θ ← θ − r · ∇L(θ)
# Update φ with confidence loss
φ ← φ − r · ∇L(φ)
```

FIG. 4

DISTANCE-BASED LEARNING CONFIDENCE MODEL

CROSS REFERENCE TO RELATED APPLICATIONS

This U.S. patent application is a continuation of, and claims priority under 35 U.S.C. § 120 from, U.S. patent application Ser. No. 17/031,144, filed on Sep. 24, 2020, which claims priority under 35 U.S.C. § 119(e) to U.S. Provisional Application 62/904,978, filed on Sep. 24, 2019. The disclosures of these prior applications are considered part of the disclosure of this application and are hereby incorporated by reference in their entireties.

TECHNICAL FIELD

This disclosure relates to a distance-based learning confidence model.

BACKGROUND

Machine learning models receive an input and generate an output, e.g., a predicted output, based on the received input. Machine learned models are trained on data. However, quantifying the confidence of a trained model for a prediction (also known as confidence calibration) is a challenge. For a 'well-calibrated' model, the predictions with higher confidence should be more likely to be accurate. However, predictive probabilities obtained at the end of the pipeline (the softmax output), which are erroneously interpreted as model confidence, calibrate the model's decision quality poorly—the confidence value tends to be large even when the classification is inaccurate.

SUMMARY

One aspect of the disclosure provides a method for jointly training a classification model and a confidence model. The method includes receiving, at data processing hardware, a training data set including a plurality of training data subsets. Each training data subset is associated with a different respective class and has a plurality of corresponding training examples that belong to the respective class. From two or more training data subsets in the training data set, the method also includes selecting, by the data processing hardware, a support set of training examples and a query set of training examples. The support set of training examples includes K number of training examples sampled from each of the two or more training data subsets, and the query set of training examples includes training examples sampled from each of the two or more training data subsets that are not included in the support set of training examples. For each respective class associated with the two or more training data subsets, the method further includes determining, by the data processing hardware, using the classification model, a centroid value by averaging K number of support encodings associated with the K number of training examples in the support set of training examples that belong to the respective class. For each training example in the query set of training examples, the method also includes: generating, by the data processing hardware, using the classification model, a query encoding; determining, by the data processing hardware, a class distance measure representing a respective distance between the query encoding and the centroid value determined for each respective class; determining, by the data processing hardware, a ground-truth distance between the query encoding and a ground-truth label associated with the corresponding training example in the query set of training examples; and updating, by the data processing hardware, parameters of the classification model based on the class distance measure and the ground-truth distance. For each training example in the query set of training examples identified as being misclassified, the method further includes: generating, by the data processing hardware, using the confidence model, a standard deviation value for the query encoding generated by the classification model for the corresponding misclassified training example; sampling, by the data processing hardware, using the standard deviation value and the query encoding, a new query encoding for the corresponding misclassified training example; and updating, by the data processing hardware, parameters of the confidence model based on the new query encoding.

Implementations of the disclosure may include one or more of the following optional features. In some implementations, the ground-truth label includes a ground-truth centroid value within a distance-based representation space. In some examples, updating the parameters of the classification model based on the class distance measure and the ground-truth distance trains the classification model to minimize intra-class distances and maximize inter-class distances.

In some implementations, the confidence model is trained to maximize the standard deviation value for larger ground-truth distances and sample new query encodings close to respective ground-truth centroid values. In some examples, any training examples in the query set of training example identified as being misclassified include any training examples in the query set of training examples that include ground-truth distances failing to satisfy a distance threshold. In some implementations, the confidence model is not trained on training examples in the query set of training examples that include ground-truth distances satisfying a distance threshold. In some examples, updating parameters of confidence model includes updating the parameters of the confidence model to encourage the confidence model to output larger standard deviation values for query encodings associated with larger class distance measures. In some implementations, the training examples include image data. The classification model may include a deep neural network (DNN). In some examples, the confidence model includes a deep neural network (DNN).

Another aspect of the disclosure provides a system for jointly training a classification model and a confidence model. The system includes data processing hardware and memory hardware in communication with the data processing hardware. The memory hardware stores instructions that when executed by the data processing hardware cause the data processing hardware to perform operations that includes receiving a training data set including a plurality of training data subsets. Each training data subset is associated with a different respective class and has a plurality of corresponding training examples that belong to the respective class. From two or more training data subsets in the training data set, the operations also include selecting a support set of training examples and a query set of training examples. The support set of training examples includes K number of training examples sampled from each of the two or more training data subsets, and the query set of training examples includes training examples sampled from each of the two or more training data subsets that are not included in the support set of training examples. For each respective class associated with the two or more training data subsets, the operations further include determining, using the classification model, a centroid value by averaging K number of support encodings associated with the K number of training examples in the support set of training examples that belong to the respective class. For each training example in the query set of training examples, the operations also include generating, using the classification model, a query encoding, determining a class distance measure representing a respective distance between the query encoding and the centroid value determined for each respective class; determining a ground-truth distance between the query encoding and a ground-truth label associated with the corresponding training example in the query set of training examples; and updating parameters of the classification model based on the class distance measure and the ground-truth distance. For each training example in the query set of training examples identified as being misclassified, the operations further include generating, using the confidence model, a standard deviation value for the query encoding generated by the classification model for the corresponding misclassified training example; sampling, using the standard deviation value and the query encoding, a new query encoding for the corresponding misclassified training example; and updating parameters of the confidence model based on the new query encoding.

Implementations of the disclosure may include one or more of the following optional features. In some implementations, the ground-truth label includes a ground-truth centroid value within a distance-based representation space. In some examples, updating the parameters of the classification model based on the class distance measure and the ground-truth distance trains the classification model to minimize intra-class distances and maximize inter-class distances.

In some implementations, the confidence model is trained to maximize the standard deviation value for larger ground-truth distances and sample new query encodings as close to ground-truth centroid. In some examples, any training examples in the query set of training example identified as being misclassified include any training examples in the query set of training examples that include ground-truth distances failing to satisfy a distance threshold. In some implementations, the confidence model is not trained on training examples in the query set of training examples that include ground-truth distances satisfying a distance threshold. In some examples, updating parameters of confidence model includes updating the parameters of the confidence model to encourage the confidence model to output larger standard deviation values for query encodings associated with larger class distance measures. In some implementations, the training examples include image data. The classification model may include a deep neural network (DNN). In some examples, the confidence model includes a deep neural network (DNN).

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is an example algorithm for using the DBLE to train the classification model and the calibration model.

Like reference symbols in the various drawings indicate like elements.

DETAILED DESCRIPTION

Conventional techniques for training deep neural networks (DNNs) typically results in poorly calibrated DNNs. Since DNNs are deployed in many important decision-making scenarios, poor calibration can result in wrong decisions that can be very costly. To prevent acting on wrong decisions made by a DNN, it is desirable for the DNN to output confidence estimations on decisions output by the DNN. To this end, a system can refrain from acting upon decisions output by the DNN with low confidence can be avoided from being acted upon and/or human experts can be consulted, so that detrimental consequences can be avoided if these low confidence decisions were relied and acted upon. Unfortunately, accurate confidence estimation is challenging for DNNs, especially for DNNs that are poorly calibrated.

Implementations herein are directed toward a training framework that implements distance-based Learning from Errors (DBLE) to yield well-calibrated neural networks. In DBLE, a system trains a classification model (also referred to as "predictive model") and a confidence model in parallel. The training of the classification model with DBLE learns a distance-based representation space, whereby the distance-based representation space defines an L2 distance for a test sample to a ground-truth class center of the text sample for calibrating performance of the classification model on the given test sample. Thus unlike vanilla training (conventional training to optimize maximum likelihood), training classification models with DBLE possess a feature for use as a golden confidence measurement calibrating its decision quality. However, since calculating this distance for a test sample requires a label for the ground-truth class center, it cannot be directly obtained at inference. Therefore, the training of the confidence model with DBLE is configured to estimate this distance as a confidence score during inference. To train the confidence model, DBLE utilizes misclassified training samples during the training of the classification model (learning from training errors).

Figure 1:
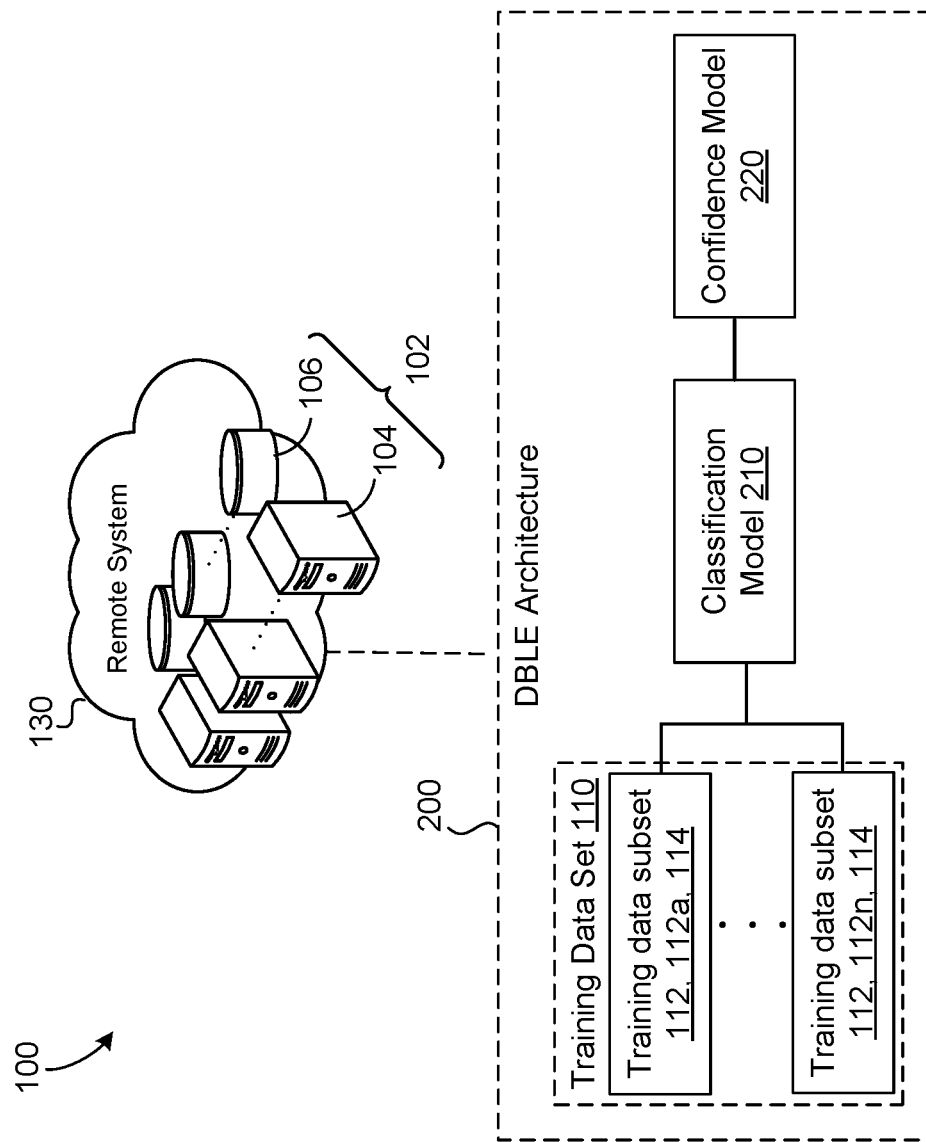
FIG. 1 is an example system providing a training framework that implements distance-based Learning from Errors (DBLE) to train a classification model and a calibration model.

Referring to FIG. 1, in some implementations, a system 100 includes a computing environment 130 including resources 102, such as data processing hardware 104 (e.g., server(s) or CPU(s) and/or remote memory hardware 106 storing instructions that when executed on the data processing hardware 104 cause the data processing hardware 104 to perform operations. A distance-based Learning from Errors (DBLE) architecture 200 that trains a classification model 210 and a confidence model 220 in parallel may reside on the resources 102. In the example shown, the DBLE architecture 200 trains the classification model 210 on a training data set 110 including a plurality of training data subsets 112, 112a-n that each include multiple training examples 114 associated with a different respective class. Each training example 114 includes a corresponding ground-truth label indicating the respective class the training example 114 belongs to. Here, the ground-truth label may include a ground-truth centroid value 212G in a distance-based representation space. In some examples, the training examples correspond to images or image data.

As will become apparent, the DBLE architecture 200 is configured to learn a distance-based representation space through the classification model 210 and exploit distances in the space to yield well-calibrated classification. The DBLE architecture 200 relies on a correlation that a location of a test sample in the representation space and a distance of the test sample to training samples in the same class contains useful information for guiding confidence estimation. Namely, the DBLE architecture is configured to adapt prototypical learning for training and inference to learn the distance-based representation space through classification such that the distance of the test sample to a ground-truth class center is able to calibrate performance of the classification model 210. As used herein, prototypical learning refers to both training and prediction depending solely on a distance of samples to their corresponding class centers (also referred to as 'prototypes') in the representation space, thereby optimizing training of the classification model 210 to minimize intra-class distances and maximize inter-class distances so that related samples are clustered together in the representation space. Since the ground truth label for the ground-truth class center is unknown during inference, the DBLE architecture 200 trains the separate confidence model 220 jointly with the classification model 210, to thereby permit estimation of the distance of a test sample to its ground-truth class center. Specifically, implementations are directed toward training the confidence model on only training samples that were misclassified by the classification model 210 during training. The models 210, 220 may each include deep neural networks (DNNs).

Figure 2:
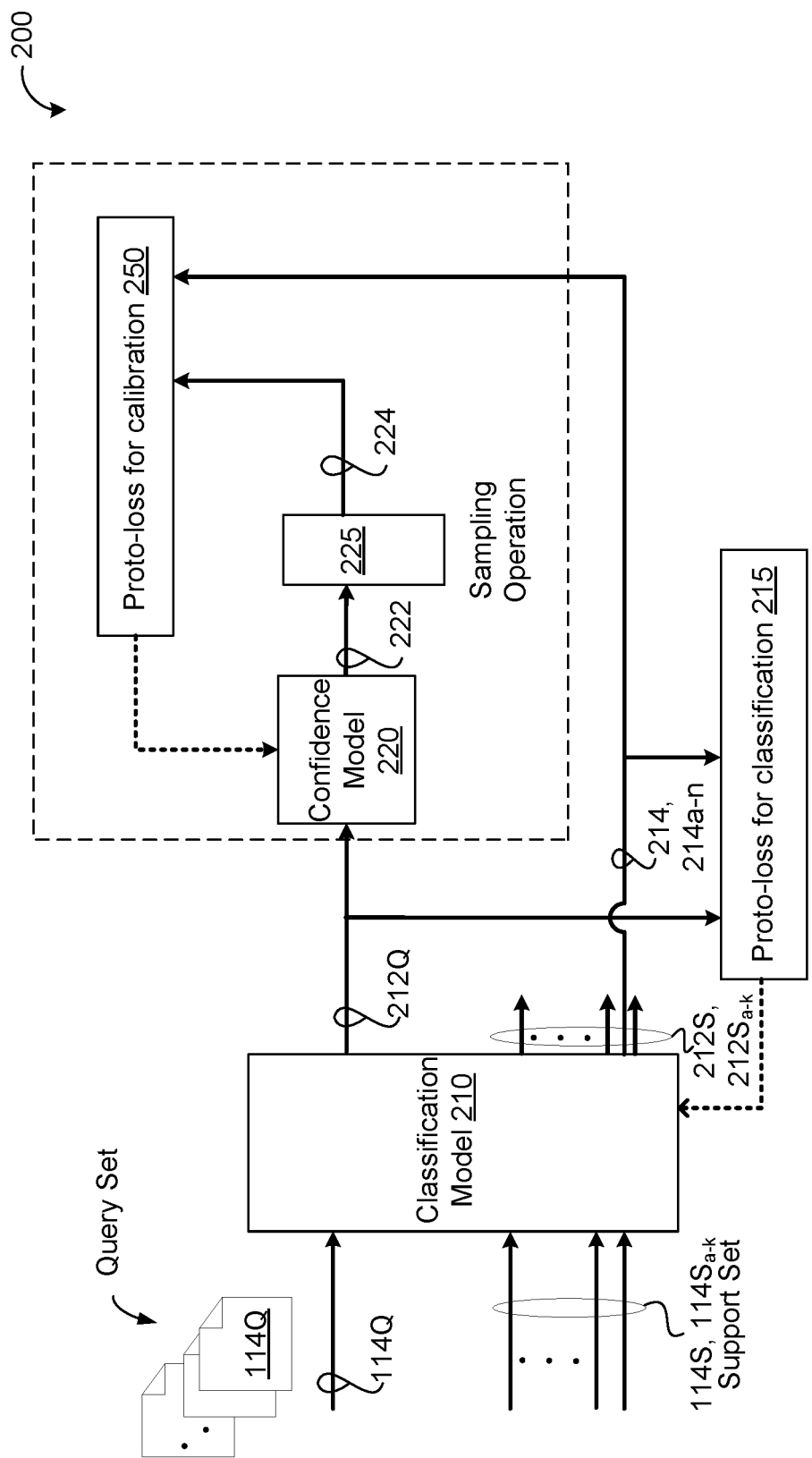
FIG. 2 is an example of a DBLE architecture for training the classification model and the calibration model of FIG. 1.

FIG. 2 provides an example DBLE architecture 200 for jointly training the classification model 210 and the confidence model 220 in parallel such that training examples 114 identified as being misclassified by the classification model 210 are used to train the confidence model 220 to enable the confidence model 220 to estimate a distance of a test sample to its ground-truth center in a distance-based representation space during inference when the ground-truth center is not known. By contrast to vanilla training techniques for classification that are based on variants of min-batch gradient descent, the DBLE architecture uses episodic training for training the classification model 210 in which DBLE creates an episode by randomly sampling training examples 114 from the training data set 110 to select two sets of training examples: (1) a support set of training examples 114S; and (2) a query set of training examples 114Q. More specifically, the DBLE creates each episode by first randomly sampling/selecting N number of training data subsets 112 from the plurality of data subsets 112. Thereafter, the DBLE selects the support set of training samples 114S by sampling K number of training examples 114Sa-k from each of the N number of training data subsets 112 and selects the query set of training examples 114Q by sampling training examples 114 from each of the N number of training data subsets 112 that are not included in the support set of training samples 114S. In some examples, the N number of training data subsets includes two or more training data subsets 112 in the training data set 110. While the N number of training data subsets could include the entire plurality of training data subsets, DBLE does not require using the entire training data subset since fitting training examples from the support set of training examples in a batch to processor memory can be challenging when the number of different classes is very large.

For each respective class associated with the N number of training data subsets 112, the DBLE determines, using the classification model 210, a centroid value 214 by averaging K number of support encodings 212S, 212Sa-k associated with the K number of training examples 114Sa-k in the support set of training examples 114S that belong to the respective class. That is, for a given class, the classification model 210 receives, as input, each of the K number of training examples 114 in the support set of training examples 114S, and generates, as output, a corresponding support encoding 212S for each training example in the support set. For the given class, DBLE averages the K number of support encodings 212S to calculate/determine a respective centroid value 214 for the respective given class. Accordingly, DBLE repeats for the remaining N number of training subsets 212 so that N number of centroid values 214 are computed such that each centroid value 214 represents a respective one of the N number of classes.

The classification model 210 further generates a respective query encoding 212Q, $h_i$, for each training example in the query set of training examples 114Q and the DBLE determines a class distance measure representing a respective distance between the query encoding 212Q and the centroid value 214 determined for each respective class. The DBLE also determines a ground-truth distance between the query encoding 212Q and the ground-truth centroid value 212G associated with the corresponding training example in the query set of training examples 114Q and updates parameters of the classification model 210 based on the class distance measure and the ground-truth distance. Specifically, the DBLE employs a proto-loss for classification 215 that receives the query encoding 212Q and the centroid values 214, 214a-n determined for each of the N number of respective classes to determine/calculate the respective class distance measures, and also receives the ground-truth centroid value 212G to determine/calculate the ground-truth distance between the query encoding 212Q and the ground-truth centroid value 212G. Accordingly, the classification model 210 is a function parameterized by trainable parameters θ and uses a loss associated with a negative log-likelihood of the ground-truth centroid value 212G of each training example in the query set of training examples 114Q given the support set of training examples 114S represented by the following equation:

$$\mathcal{L}(\theta) = \mathop{\mathbb{E}}_{(S_e, Q_e)} -\sum_{i=1}^{Q_e} \log p(y_i \mid x_i, S_e; \theta). \tag{1}$$

where Se is the support set of training examples 114S, Qe is the query set of training examples 114Q, $y_i$ is the ground-truth centroid value 212G, and $x_i$ is the query set training example 114Q input to the classification model, and θ represents the trainable parameters of the classification model 210. The prototypical loss for classification 215 is configured to calculate a predictive label distribution of each training example $x_i$ in the query set of training examples 114Q based on the respective class distance measure for each respective class of the N number of classes using the following equation:

$$p(y_i \mid x_i, S_e; \theta) = \frac{\exp(-d(h_i, c_{y_i}))}{\sum_{k'} \exp(-d(h_i, c_{k'}))} \quad (2)$$

where $h_i$ is the corresponding query encoding 214Q representing the corresponding training example xi in the distance-based representation space. Thus, the DBLE updates the trainable parameters θ of the classification model 210 by minimizing the loss, $\mathcal{L}(\theta)$, calculated by Equation 1 with the predictive label distribution, $p(y_i|x_i, S_e; \theta)$, calculated for each training example $x_i$ in the query set of training examples 114Q using Equation 2. Thus, in the representation space for the query encodings 212Q and the centroid values 214 determined for the N number of classes, training of the classification model 210 maximizes inter-class distances and minimizes intra-class distances. As a result, training examples belonging to a same class are clustered together and clusters representing different classes are pushed apart in the representation space.

While using the classification model 210 to classify each training example in the query set of training examples 114Q, the DBLE 200 identifies any training examples that were misclassified by the classification model 210. The DBLE 200 may identify a training example as misclassified when classification predicted by the classification model 210 does not match the corresponding ground-truth label 212G for the training example. In some examples, the DBLE 200 identifies the training example as misclassified when the respective ground-truth distance between the query encoding 212Q and the ground-truth centroid value 212G associated with the corresponding training example in the query set of training examples 114Q fails to satisfy a distance threshold in the representation space. Otherwise, the DBLE 200 may identify any training examples in the query set of training examples 114Q having a respective ground-truth distance between the query encoding 212Q and the ground-truth centroid value 212G associated with the corresponding training example in the query set of training examples 114Q that satisfy (e.g., less than or equal to) the distance threshold as correctly classified by the classification model 210.

In some implementations, the confidence model 220 trains on training examples in the query set of training examples 114Q identified as being misclassified by the classification model 210. Generally, correctly-classified training examples constitute a vast majority of the training examples encountered during training of the classification model. Based on this notion, using all of the training examples 114Q would result in small/short class distance measures associated with the correctly-classified training examples in the query set of training examples 114Q dominating the training of the confidence model 220, thereby making it more difficult for the confidence model 220 to capture larger class distance measures associated with the mis-classified training examples constituting a minority of all the training examples 114Q.

In the example DBLE architecture 200 of FIG. 2, the dashed box around the confidence model 220, as well as a sampling operation 225 and proto-loss for calibration 250 associated with the confidence model 220, denotes training of the confidence model 220 in parallel with the classification model 210 using only each training example in the query set of training examples 114Q identified as being misclassified. Thus, for each training example in the query set of training examples 114Q identified as being misclassified, the DBLE executing on the data processing hardware 104: generates, using the confidence model 220, a standard deviation value 222, σ, for the query encoding 212Q generated by the classification model 210 for the corresponding misclassified training example; samples, using the standard deviation value 222 and the query encoding 212Q, a new query encoding 224 for the corresponding misclassified training example, and updates parameters φ of the confidence model 220 based on the new query encoding 224.

The confidence model 220 is trained to output larger standard deviation values 222, σ, for query encodings 212Q associated with larger class distance measures. To sample a new query encodings 224, $z_s$, the confidence model 220 uses a sampling operation 225 that samples from an isotropic Gaussian distribution parameterized by the corresponding query encoding 212Q, $h_s$, and corresponding standard deviation value 222, $\sigma_s$. The proto-loss for calibration 250 is configured to calculate a prototypical loss using a predicted label distribution of the new query encoding 224, $z_s$, sampled for each misclassified training example $x_s$ using the following equation:

$$p(y_s \mid x_s; \phi) = \frac{\exp(-d(z_s, c_{y_s}))}{\sum_{k'} \exp(-d(z_s, c_{k'}))} \quad (3)$$

Thus, the DBLE updates the trainable parameters φ of the confidence model 220 to encourage the confidence model 220 to output larger standard deviation values 222, σ, for query encodings 212Q associated with larger class distance measures. Notably, by fixing the query encoding 212Q for each mis-classified training example in the representation space, maximizing Equation 3 forces the new query encodings 224 to be as close to the respective ground-truth centroid value 212G. Since mis-classified training examples include query encodings 212Q further away from the ground-truth centroid value 212G, encouraging the confidence model 220 to output larger corresponding standard deviation values 222 forces the new query encodings 224 to be close to the ground-truth centroid values 212G. FIG. 4 provides an example algorithm 400 representing the training of the classification and calibration models 210, 220 using the DBLE 200 described in FIG. 2.

Figure 3B:
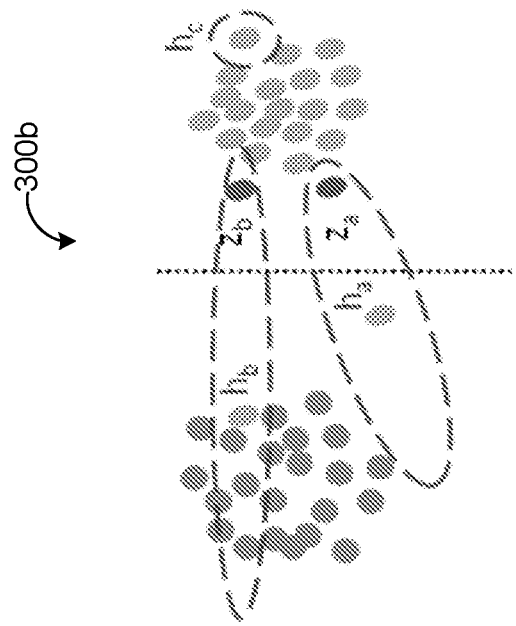
FIGS. 3A and 3B show plots of a distance-based representation space of training examples.
Figure 3A:
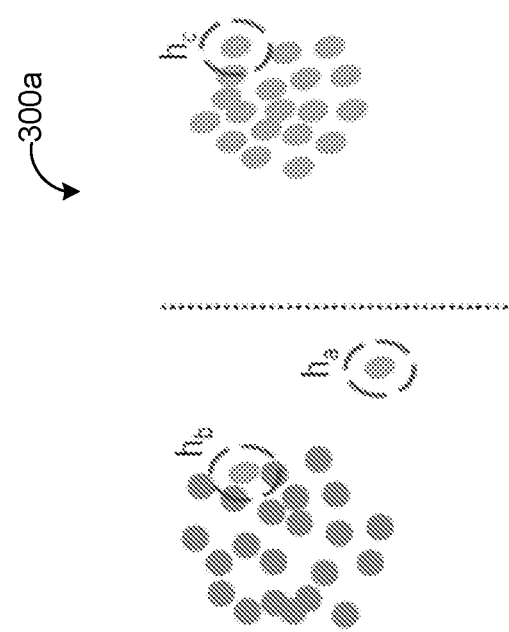

FIGS. 3A and 3B show example plots 300a, 300b of dots representing training examples from the query set of training examples 114Q in the representation space. The dotted vertical line in each of plots 300a, 300b denotes a decision boundary where training examples on the left and right sides belong to different respective classes. Further, the dotted circles represent the standard deviation values 222, σ, for corresponding query encodings 212Q, $h_a$-$h_c$, wherein $h_a$, $h_b$ are associated with mis-classified query encodings 222Q corresponding to mis-classified training examples 114Q and $h_c$ is associated with a correctly-classified query encoding 222Q corresponding to a correctly-classified training example 114Q. The plot 300a of FIG. 3A shows short standard deviation values 222 for both the mis-classified query encodings $h_a$, $h_b$ and the correctly-classified query encoding $h_c$ before updating the trainable parameters φ of the confidence model 220. After updating the trainable parameters φ of the confidence model 220, the plot 300b of FIG. 3B shows larger standard deviation values 222 for the the mis-classified query encodings $h_a$, $h_b$ as a result of the proto-loss for calibration moving the new query encodings $z_a$, $z_b$ sampled from the mis-classified training examples as close as possible to the ground-truth centroid value 212G associated with correct class.

Referring back to FIG. 2, during inference, the DBLE 200 executing on the data processing hardware 104 calculates a class center 214 for every class c in a training set by averaging the representations 212S of all corresponding training examples using the following equation:

$$c_k^{test} = \frac{1}{|\mathcal{T}_k|} \sum_{(x_i, y_i) \in \mathcal{T}_k} f_\theta(x_i) \quad (4)$$

where $T_k$ is the set of all training examples belonging to class k. Then, given a test sample, $x_t$, the respective class distance measures of the corresponding query encoding 212Q to each class center 214. The prediction of the label of $x_t$ is based on the class distance measures such that $x_t$ is assigned to the class with the closest center in the representation space. Thus, if the query encoding 212Q is too far from its ground-truth class center 214G, it is likely misclassified. Since the ground-truth centroid value 212G is unknown for a test sample $x_t$ at inference, i.e., no label is available, the DBLE employs the trained confidence model 220 to estimate the respective class distance measures to assist the classification model 210 in predicting the label. That is, the classification model 210 predicts a label for every test sample $x_t$ using the corresponding query encoding $h_t$ 212Q. The confidence model 220 then outputs the standard deviation value $\sigma_t$ 222 for the query encoding $h_t$ and the sampling operation 225 samples the new query encoding 224. The DBLE then averages the predictive label distributions as a confidence estimation using the following equation:

$$\hat{p}(y_t' \mid x_t; \phi) = \frac{1}{U} \sum_{u=1}^{U} \frac{\exp(-d(z_t^u, c_{y_t'}))}{\sum_{k'} \exp(-d(z_t^u, c_{k'}))} \quad (5)$$

Where U is a total number of new query encodings $z_t$ 224 and $\hat{p}(y_t'|x_t;\phi)$ is used as a confidence score for calibrating the prediction $y_t'$ of the classification model 210. Accordingly, the DBLE adds more randomness to representation sampling for test examples further away from ground-truth class centers (likely misclassified) since estimated variation from the confidence model is large.

Figure 5:
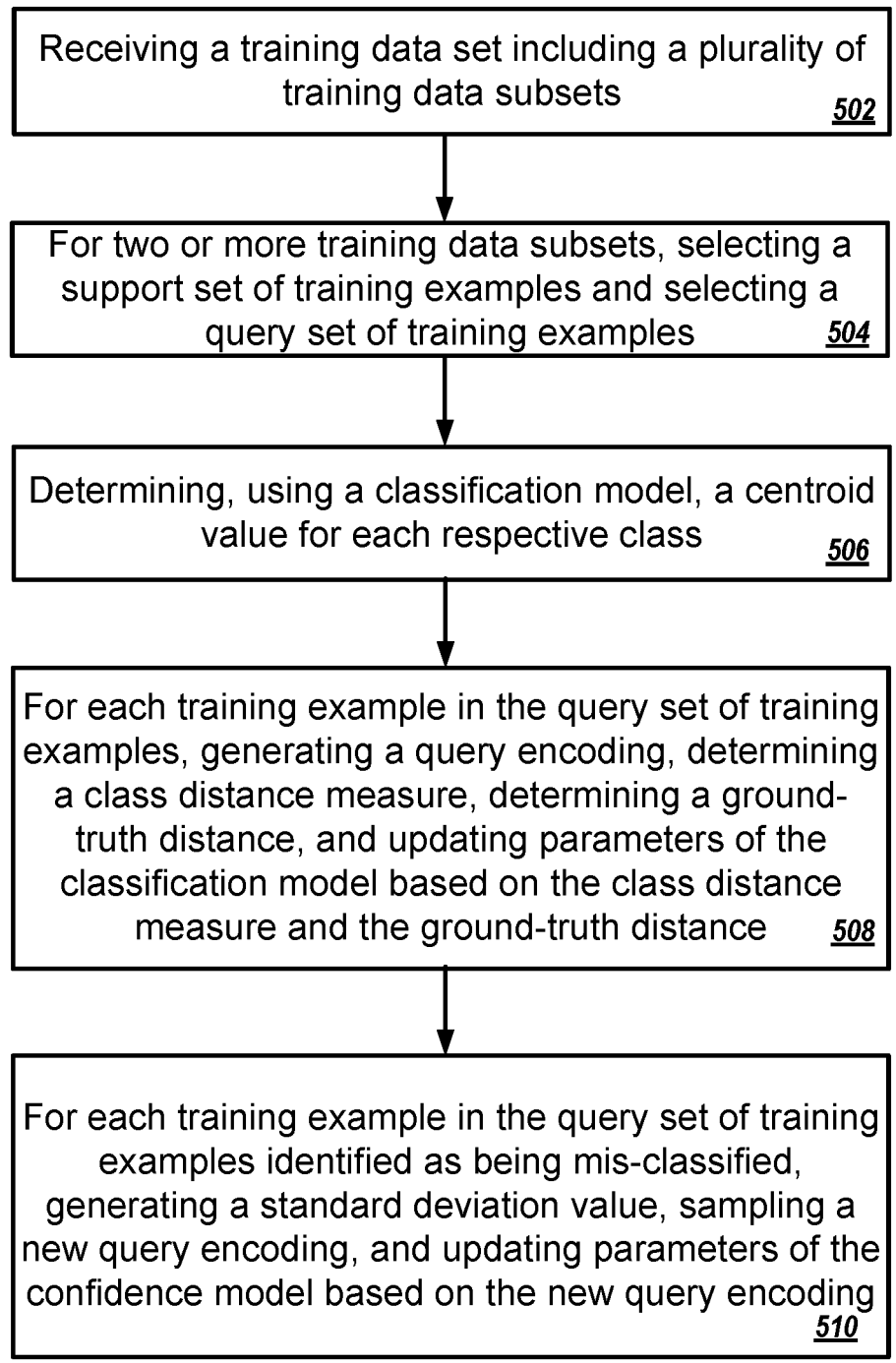
FIG. 5 is a flowchart of an example arrangement of operations for a method of training a classification model in parallel with a confidence model.

FIG. 5 is a flowchart of an example arrangement of operations for a method 500 of training a classification model 210 in parallel with a confidence model 220. The method 500 may execute on the data processing hardware 104 of FIG. 1 based on instructions stored on the memory hardware 106 of FIG. 1. At operation 502, the method 500 includes receiving, at data processing hardware 104, a training data set 110 including a plurality of training data subsets 112. Each training data subset 112 is associated with a different respective class and has a plurality of corresponding training examples 114 that belong to the respective class.

At operation 504, for two or more training data subsets 112 in the training data set 110, the method 500 includes selecting, by the data processing hardware 104, a support set of training examples 114S, and a query set of training examples 114Q. The support set of training examples 114S includes K number of training examples 114 sampled from each of the two or more training data subsets 112. The query set of training examples 114Q includes training examples 114 sampled from each of the two or more training data subsets 112 that are not included in the support set of training examples 114S.

The method 500, at operation 506, includes determining, by the data processing hardware 104, using the classification model 210, a centroid value 214 by averaging K number of support encodings 215 associated with the K number of training examples 114 in the support set of training examples 114S that belong to the respective class. At operation 508, for each training example in the query set of training examples 114Q, the method 500 includes generating, by the data processing hardware 104, using the classification model 210, a query encoding 212Q; determining, by the data processing hardware 104, a class distance measure representing a respective distance between the query encoding 212Q and the centroid value 214 determined for each respective class; determining, by the data processing hardware 104, a ground-truth distance between the query encoding 212Q and a ground-truth label 214G associated with the corresponding training example 114 in the query set of training examples 114Q; and updating, by the data processing hardware 104, parameters of the classification model 210 based on the class distance measure and the ground-truth distance.

At operation 510, for each training example 114 in the query set of training examples 114Q identified as being misclassified, the method 500 includes generating, by the data processing hardware 104, using the confidence model 220, a standard deviation value 222 for the query encoding 212Q generated by the classification model 210 for the corresponding misclassified training example; sampling, by the data processing hardware 104, using the standard deviation value 222 and the query encoding 212Q, a new query encoding 224 for the corresponding misclassified training example; and updating, by the data processing hardware 104, parameters of the confidence model 220 based on the new query encoding 224.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
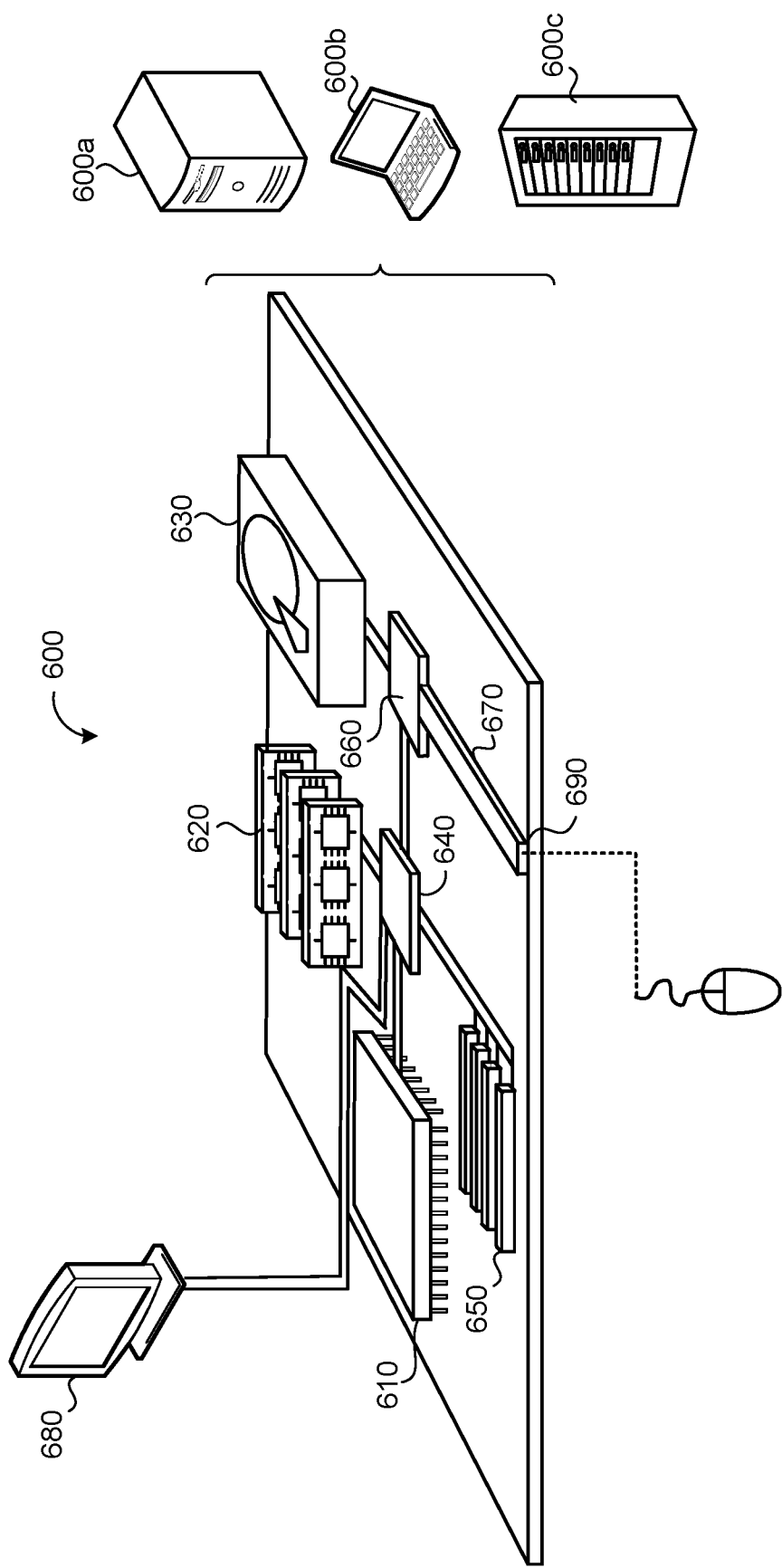
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
    obtaining a set of training samples, each training sample of the set of training samples comprising a ground-truth label;
    training, using the set of training samples, a classification model; and
    while training the classification model:
        determining that the classification model misclassified a respective training sample of the set of training samples based on the ground-truth label of the respective training sample; and
        in response to determining that the classification model misclassified the respective training sample, training a confidence model using the respective training sample,
    wherein the set of training samples comprises a plurality of training data subsets, each training data subset associated with a different respective class and having a plurality of corresponding training examples that belong to the respective class.

2. The method of claim 1, wherein training the classification model comprises:
    selecting, from the set of training samples, a support set of training samples;
    selecting, from the set of training examples, a query set of training samples, the query set of training samples comprising training samples not included in the support set of training samples; and
    training the classification model using the support set of training samples and the query set of training samples.

3. The method of claim 1, wherein determining that the classification model misclassified the respective training sample comprises determining that a ground-truth distance between a prediction of the classification model and the ground-truth label fails to satisfy a threshold distance.

4. The method of claim 1, wherein the ground-truth label comprises a ground-truth centroid value within a distance-based representation space.

5. The method of claim 1, wherein the confidence model is trained only on training samples misclassified by the classification model while the classification model is trained.

6. The method of claim 1, wherein the confidence model predicts a confidence score for each prediction of the classification model.

7. The method of claim 1, wherein the set of training samples comprise image data.

8. The method of claim 1, wherein the classification model comprises a deep neural network (DNN).

9. The method of claim 1, wherein the confidence model comprises a deep neural network (DNN).

10. A system comprising:
    data processing hardware; and
    memory hardware in communication with the data processing hardware, the memory hardware storing instructions that when executed on the data processing hardware cause the data processing hardware to perform operations comprising:
        obtaining a set of training samples, each training sample of the set of training samples comprising a ground-truth label;
        training, using the set of training samples, a classification model; and
        while training the classification model:
            determining that the classification model misclassified a respective training sample of the set of training samples based on the ground-truth label of the respective training sample; and
            in response to determining that the classification model misclassified the respective training sample, training a confidence model using the respective training sample,
        wherein the set of training samples comprises a plurality of training data subsets, each training data subset associated with a different respective class and having a plurality of corresponding training examples that belong to the respective class.

11. The system of claim 10, wherein training the classification model comprises:
    selecting, from the set of training samples, a support set of training samples;
    selecting, from the set of training examples, a query set of training samples, the query set of training samples comprising training samples not included in the support set of training samples; and
    training the classification model using the support set of training samples and the query set of training samples.

12. The system of claim 10, wherein determining that the classification model misclassified the respective training sample comprises determining that a ground-truth distance between a prediction of the classification model and the ground-truth label fails to satisfy a threshold distance.

13. The system of claim 10, wherein the ground-truth label comprises a ground-truth centroid value within a distance-based representation space.

14. The system of claim 10, wherein the confidence model is trained only on training samples misclassified by the classification model while the classification model is trained.

15. The system of claim 10, wherein the confidence model predicts a confidence score for each prediction of the classification model.

16. The system of claim 10, wherein the set of training samples comprise image data.

17. The system of claim 10, wherein the classification model comprises a deep neural network (DNN).

18. The system of claim 10, wherein the confidence model comprises a deep neural network (DNN).

\* \* \* \* \*